United States Patent
Nagashima et al.

(10) Patent No.: US 8,629,194 B2
(45) Date of Patent: Jan. 14, 2014

(54) FORMED ARTICLE AND PROCESS FOR THE PRODUCTION THEREOF

(71) Applicant: Teijin Engineering Ltd., Osaka (JP)

(72) Inventors: Ryohichi Nagashima, Osaka (JP); Haruko Hirose, Hino (JP)

(73) Assignee: Teijin Engineering Ltd., Osaka (JP)

( * ) Notice: Subject to any disclaimer, the term of this patent is extended or adjusted under 35 U.S.C. 154(b) by 0 days.

(21) Appl. No.: 13/644,408

(22) Filed: Oct. 4, 2012

(65) Prior Publication Data

US 2013/0029398 A1  Jan. 31, 2013

Related U.S. Application Data

(62) Division of application No. 12/089,282, filed as application No. PCT/JP2006/320242 on Oct. 4, 2006.

(30) Foreign Application Priority Data

Oct. 5, 2005 (JP) .................................. 2005-292644
Aug. 28, 2006 (JP) .................................. 2006-230684

(51) Int. Cl.
*C08J 9/00* (2006.01)

(52) U.S. Cl.
USPC ............. 521/134; 521/82; 521/92; 521/99; 528/491

(58) Field of Classification Search
USPC .................. 521/82, 92, 99, 134; 528/491
See application file for complete search history.

(56) References Cited

U.S. PATENT DOCUMENTS

| 4,110,529 A * | 8/1978 | Stoy ............................ 528/491 |
| 4,511,711 A | 4/1985 | Shimomura et al. |
| 4,548,769 A | 10/1985 | Shimomura et al. |
| 4,761,232 A | 8/1988 | Bright |
| 4,876,287 A | 10/1989 | Babcock et al. |
| 4,915,839 A | 4/1990 | Marinaccio et al. |
| 5,969,020 A | 10/1999 | Shalaby et al. |
| 6,696,258 B1 | 2/2004 | Wei et al. |

FOREIGN PATENT DOCUMENTS

| JP | 58-139703 A | 8/1983 |
| JP | 64-65143 A | 3/1989 |
| JP | 1-245035 A | 9/1989 |
| JP | 2-647 A | 1/1990 |

(Continued)

OTHER PUBLICATIONS

Hou et al., "Porous polymeric structures for tissue engineering prepared by a coagulation, compression molding, and salt leaching technique," Biomaterials 24 (2003), pp. 1937-1947.*

(Continued)

*Primary Examiner* — Randy Gulakowski
*Assistant Examiner* — Kara Boyle
(74) *Attorney, Agent, or Firm* — Sughrue Mion, PLLC

(57) ABSTRACT

This invention is made to provide a formed article which ensures, for example, that an active substance included therein and a substance outside capsules can effectively come in contact with each other without suffering influences such as a pressure loss. This invention is a formed article having a plurality of cells formed in a polymer (A), (1) each cell including an active substance, (2) the polymer (A) having pores, each pore communicating with other pores and having a diameter in the range of 1 nm to 1 μm, and (3) the internal wall of each cell and the active substance being substantially not in contact with each other.

14 Claims, 8 Drawing Sheets

(56) References Cited

FOREIGN PATENT DOCUMENTS

| | | |
|---|---|---|
| JP | 6-157807 A | 6/1994 |
| JP | 2002-69222 A | 3/2002 |
| JP | 2002-80629 A | 3/2002 |
| JP | 2002-348401 A | 12/2002 |
| JP | 2003-88747 A | 3/2003 |
| JP | 2004-25099 A | 1/2004 |
| JP | 2004-115764 A | 4/2004 |
| JP | 2004-123973 A | 4/2004 |
| JP | 2006-257371 A | 9/2006 |
| JP | 2006-265468 A | 10/2006 |
| JP | 2006-335917 A | 12/2006 |
| WO | 2005/074627 A2 | 8/2005 |

OTHER PUBLICATIONS

Extended European Search Report issued for European Application No. EP 06 82 1829, dated Apr. 28, 2010.

Cheng et al., "Formation of mica-intercalated-Nylon 6 nanocomposite membranes by phase inversion method", Journal of Membrane Science, Elsevier Scientific Publ. Company, Amsterdam, NL, vol. 172, Jul. 1, 2000.

Hawley's Condensed Chemical Dictionary, Definition of "Pore."; John Wiley and Sons; 14th Edition, 2002.

* cited by examiner

FORMED ARTICLE AND PROCESS FOR THE PRODUCTION THEREOF

CROSS REFERENCE TO RELATED APPLICATIONS

This is a divisional of application Ser. No. 12/089,282 filed Apr. 4, 2008, which is the National Stage of PCT/JP2006/320242 filed Oct. 4, 2006; the above noted prior applications are all hereby incorporated by reference.

TECHNICAL FIELD

This invention relates to a formed article containing an active substance and a process for the production thereof. More specifically, the present invention relates to a formed article having a plurality of cells with an active substance included therein each and a process for the production thereof.

TECHNICAL BACKGROUND

Conventionally, as a support for active substances such as various catalysts, etc., there are proposed formed articles in the form of a membrane or microcapsules that is or are hollow or structurally porous.

For example, there has been proposed a membrane having a continuous porous structure having a spinodal separation pattern (see Patent Document 1). Further, porous spherical particles are known for a support for various catalysts, electrophotographic toners, an electronic material for displays, chromatography, adsorbents, etc. (see Patent Document 2). As an immobilizing carrier for active matters typified by microorganisms, bacteria and enzymes, further, there has been proposed a microcapsule having a hollow space and a porous capsule wall and having a structure in which cells of the capsule wall communicate with the hollow space in the capsule through fine pores (see Patent Document 3). Further, there has been proposed a microcapsule having intended sustained releasability based on the control of denseness of a capsule resin wall material (see Patent Document 4). As a method for imparting a binder for an active substance with a porous structure, further, there has been proposed a method that uses, as a cells-forming agent, an inorganic salt or an organic material such as starch (see Patent Document 5).

A microcapsule is a fine container formed by covering an inclusion in the form of a solid, liquid or gas with a thin film wall material, and it has functions of protecting an unstable substance, isolating a reactive substance, controlling the diffusion of the inclusion or including an active substance or matter. For causing a microcapsule to exhibit these functions effectively, it is required to ensure that a substance outside the capsule can efficiently contact an included active substance by easy molecular diffusion without causing a pressure loss.

However, conventional microcapsules are formed each of a hollow portion and a shell covering it, the interior of each capsule is hollow, and the space and internal surface area for holding an active substance inside are limited.

Further, in microcapsules having a large particle diameter each, it is required to increase the thickness of a shell for maintaining the strength thereof. However, an active substance and a substance outside the capsule contact each other only through pores that exist in the shell and have a size of several nm to tens nm, and there is a defect that when the thickness of the shell is increased, the pressure loss by these pores increases and no efficient contact can be attained.

Further, since active substances are generally fine particles, there is involved a problem that when they are used in a packed column, impractically, the pressure loss is large. For overcoming this problem, it is general practice to fix an active substance with a binder to be granulated, and form particles. In this method, however, the active substance surface is coated with the binder, and no surface area effective for exhibition of a function can be secured. There has been hence proposed a method in which a binder is caused to include, as a cells-forming agent, an inorganic salt or an organic substance such as starch and the cells-forming agent is removed by washing, etc., after the formation of capsules. However, the defect is that no holes communicating with an outside are obtained and that the production cost thereof is also increased.

Further, when an active substance has a coagulation structure, there is a problem that part of the active substance easily comes off or separates due to an external friction or the like in a portion where the active substance is exposed directly to an external atmosphere.

Further, concerning an active substance having physiologically high activity, it is required to prevent its direct contact to a human body or its suction into a human body. In this case, it is required to coat the active substance surface with a thin film of a polymer or the like, and the problem with this is that when the coating polymer has no communicating holes, the active substance does not effectively work.

(Patent Document 1) JP 1-245035A
(Patent Document 2) JP 2002-80629A
(Patent Document 3) JP 2003-88747A
(Patent Document 4) JP 2004-25099A
(Patent Document 5) JP 64-65143A

DISCLOSURE OF THE INVENTION

It is therefore an object of this invention to provide a formed article that ensures that an active substance included in a capsule and a substance outside the capsule can efficiently contact each other without being greatly affected by a pressure loss, and the like.

It is another object of this invention to provide a formed article that ensures that the surface of an active substance is not coated with a polymer so that the surface area thereof can be utilized to the utmost.

It is still another object of this invention to provide a formed article that ensures that an active substance does not easily come of or separate even when external friction or the like is exerted.

It is yet another object of this invention to provide a formed article that ensures that an active substance does not directly come in contact with a human body or is not sucked into a human body.

The present inventors have found that when an article is formed by a so-called wet method in which a dope containing a polymer (A) and an active substance is coagulated in a coagulating liquid, there is employed a constitution in which the active substance surface is coated with a polymer (C), whereby a plurality of cells each including active substance coated with polymer (C) are formed in the polymer (A). Further, it has been found that when the formed article is washed with a specific solvent (E) to remove the polymer (C), the active substance in each cell is not held on the internal wall of each cell and a hollow is formed between the internal wall and the active substance in each cell like a bell with a ringing ball in a cavity inside. That is, it has been found that there can be obtained a structure in which another sphere is included in a sphere that is internally hollow and the included sphere is freely movable.

The present inventors have also found that when an article is formed by a so-called wet method in which a dope containing a polymer (A) and an active substance is coagulated in a coagulating liquid, there is employed a constitution in which one of the polymer (A) and the active substance is hydrophilic and the other is hydrophobic, whereby a plurality of cells each including active substance are formed in the polymer (A), the active substance in each cell is not held on the internal wall of each cell and a hollow is formed between the internal wall and the active substance in each cell like a bell with a ringing ball in a cavity inside.

Further, it has been found that pores are formed in polymer (A) by so-called spinodal decomposition to ensure that a substance outside a capsule and the active substance can easily contact each other, and this invention has been accordingly completed.

That is, this invention provides a formed article having a plurality of cells formed in a polymer (A), wherein
 (1) each cell includes an active substance,
 (2) the polymer (A) has pores, the pore connects with other pores in the polymer (A) and the pore has a diameter in the range of 1 nm to 1 µm, and
 (3) the internal wall of each cell and the active substance are substantially not in contact with each other.

Further, this invention provides a process for the production of a formed article having a plurality of cells formed in a polymer (A), wherein each cell including an active substance, the process comprises coagulating a dope in a coagulating liquid characterized in that,
 (1) the dope contains the polymer (A), a solvent (B) and an active substance coated with a polymer (C),
 (2) the coagulating liquid contains a solvent (D) that is a poor solvent to the polymer (A),
 (3) the polymer (C) is incompatible with the polymer (A), and
 (4) the solvent (B) is a good solvent to the polymer (A) and is a poor solvent to the polymer (C).

Further, this invention also provides a process far the production of a formed article having a plurality of cells formed in a polymer, wherein each cell includes an active substance, the process comprises coagulating a dope in a coagulating liquid characterized in that,
 (1) the dope contains a polymer (A), a solvent (B) that is a good solvent to the polymer (A) and an active substance,
 (2) the coagulating liquid containing a solvent (D) that is a poor solvent to the polymer (A), and
 (3) the active substance is hydrophilic when the polymer (A) in the dope is a hydrophobic polymer or the active substance is hydrophobic when the polymer (A) in the dope is a hydrophilic polymer.

BRIEF DESCRIPTION OF DRAWINGS

Like FIG. 8.

Like FIG. 11.

Figure 1:
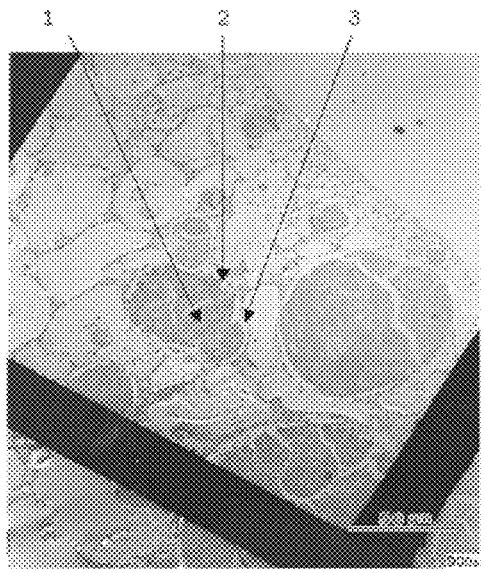
FIG. 1 is a transmission electron microscope photograph of a 50 nm thick slice of a spherical formed article in Example 1. A clearance is observed between hydrotalcite and a polymer.

| Explanations of symbols | |
| --- | --- |
| 1 | Hydrotalcite |
| 2 | Polymer |
| 3 | Clearance |
| 4 | Hydrotalcite |
| 5 | Polymer |
| 6 | Clearance |
| 7 | Hydrotalcite |
| 8 | Polymer |
| 9 | Hydrotalcite |
| 10 | Polymer |
| 11 | Polymer |
| 12 | Yeast plant |
| 13 | Clearance |
| 14 | Yeast plant |
| 15 | Polymer |
| 16 | Clearance |
| 17 | Yeast plant |
| 18 | Clearance |
| 19 | Polymer |

-continued

| | Explanations of symbols |
|---|---|
| 20 | Activated carbon |
| 21 | Clearance |
| 22 | Polymer |
| 23 | Polymer |
| 24 | Clearance |
| 25 | Activated carbon |
| 26 | Activated carbon |
| 27 | Clearance |
| 28 | Polymer |
| 29 | Activated carbon |
| 30 | Polymer |
| 31 | Polymer |
| 32 | Activated carbon |
| 33 | Polymer |
| 34 | Activated carbon |
| 35 | Dope reservoir |
| 36 | Dope |
| 37 | Discharge portion |
| 38 | Spun fiber |
| 39 | Coagulating batch |
| 40 | Coagulating liquid |
| 41 | Press roller |
| 42 | Take-up roller |

BEST MODE FOR EMBODIMENTS OF THE INVENTION

<Formed Article>
(Polymer (A))

The formed article of this invention is formed from a polymer (A). The polymer (A) includes hydrophobic polymers and hydrophilic polymers. The hydrophobic polymers include an aramid polymer, an acryl polymer, a vinyl alcohol polymer and a cellulose polymer. The hydrophilic polymers include water-soluble starch, polyvinyl alcohol, polyvinyl pyrrolidone, water-soluble cellulose acetate and chitosan.

The aramid polymer is preferably a polymer in which at least 85 mol % of aramid bonds are formed of an aromatic diamine and an aromatic dicarboxylic acid component. Specific examples of the aramid polymer include poly-p-phenyleneterephthalamide, poly-m-phenyleneterephthalamide, poly-m-phenyleneisophthalamide, and poly-p-phenyleneisophthalamide. The acryl polymer is preferably a polymer having at least 85 mol % of an acrylonitrile component. As a comonomer, there is used at least one component selected from the group consisting of vinyl acetate, methyl acrylate, methyl methacrylate and styrene sulfide sulfonate.
(Pores)

The formed article of this invention is formed of a polymer (A) having pores in itself. A pore communicates with other pores in the polymer (A), and the pores form a network structure in which the pores are inter-connected. The pores have a diameter in the range of 1 nm to 1 μm, preferably 10 nm to 500 nm. The pores are formed by a spinodal phenomenon when a dope is coagulated in a coagulating liquid containing a solvent (D) that is a poor solvent to the polymer (A). The pores can be observed on a scanning electron microscope photograph or a transmission electron microscope photograph.
(Cells)

A plurality of cells are formed in the formed article of this invention. Each cell includes an active substance. The shapes cells are not uniform. The cells have a size enough to include an active substance each. In the formed article of this invention, the internal wall of each cell and the active substance are substantially not in contact with each other. That is, the formed article of this invention has an embodiment in which a polymer (C) is filled between the internal wall of each cell and the active substance and an embodiment in which a space exists between the internal wall of each cell, and the active substance. The polymer (C) includes water-soluble polymers such as starch paste.
(Active Substance)

The active substance is preferably at least one member selected from the group consisting of metal oxides, metals, inorganic substances, minerals, synthetic resins and organisms. The metal oxides include titanium oxide, aluminum oxide, zirconium oxide, zinc oxide, silica, etc. The metals include gold, platinum, silver, iron, aluminum, stainless steel, copper, nickel, manganese, etc. The inorganic substances include activated carbon, hydrotalcite, gypsum, cement, etc. The minerals include mica, etc. The synthetic resins include polyethylene, polystyrene, polypropylene, polyester, polyphenylene sulfide, etc. The organisms include microorganisms such as fungus (yeast, etc.), bacteria (collibacilli, etc.), etc., free cells (red blood cells, white blood cells), etc.

Further, a composite active substance prepared by causing a support such as silica or activated carbon to support a metal such as silver is preferred as well. In this case, the particle diameter of the silver is preferably 1 nm to 100 μm, more preferably 1 nm to 100 nm. Further, preferably, one formed article holds active substances of two or more kinds. The active substance preferably has a particulate form. The diameter of the particles is preferably 1 nm to 500 μm, more preferably 1 nm to 100 μm, still more preferably 1 nm to 50 μm.
(Morphology of Formed Article)

The formed article of this invention preferably has the form of a mass such as a sphere or an ellipsoid, the form of a fiber such as a string, a pipe or a hollow yarn or the form of a film or membrane.
<Process for Production of Formed Article>

The process for the production of a formed article, provided by the present invention, is a process (first embodiment) for the production of a formed article having a plurality of cells formed in a polymer (A), each cell including an active substance, the process comprising coagulating a dope in a coagulating liquid, (1) the dope containing the polymer (A), a solvent (B) and an active substance coated with a polymer (C), (2) the coagulating liquid containing a solvent (D) that is a poor solvent to the polymer (A), (3) the polymer (C) being incompatible with the polymer (A), and (4) the solvent (B) being a good solvent to the polymer (A) and being a poor solvent to the polymer (C). (Dope)

The polymer (A) and the active substance are those explained with regard to the formed article. The dope may contain two or more active substances.

In this invention, the active substance is coated with a polymer (C). The polymer (C) is a polymer that is incompatible with the polymer (A). The term "incompatible" refers to a state where phase separation occurs when the polymer (A) and the polymer (B) are mixed. More specifically, the above term refers to a state where polymer molecules of different types are not at all mixed on the Order of molecules and are separated in phase, a state where polymer molecules are mixed with one another in an interface while they are separated in phase or a state where a mixture of polymers is in separated in phase while the polymers are mixed on the order of molecules in a phase of each. The polymer (C) includes water-soluble polymers such as starch paste, gelatin, dogtooth violet starch, and polyvinyl alcohol.

When the polymer (A) is a hydrophobic polymer such as an aramid polymer, an acryl polymer or polylactic acid, preferably, the polymer (C) is a water-soluble polymer such as starch paste. The coating can be carried out by placing the active substance in the polymer (C) that has been melted and stirring them. The thickness of the coating is 10 nm to 10 mm, preferably 100 nm to 1 mm.

The solvent (B) is a good solvent to the polymer (A) and a poor solvent to the polymer (C). The good solvent refers to a solvent having large dissolving power to a polymer as is generally said. The poor solvent refers to a solvent having small dissolving power to a polymer as is generally said.

For example, when the polymer (Z) is poly-m-phenyleneterephthalamide and when the polymer (c) is a water-soluble polymer, the solvent (B) is preferably N-methyl-2-pyrrolidone (NMP). When the polymer (A) is an acryl polymer and when the polymer (C) is a water-soluble polymer, the solvent (B) is preferably dimethyl sulfoxide (DMSO). Further, when the polymer (A) is polylactic acid and when the polymer (C) is a water-soluble polymer, the solvent (B) is preferably dichloromethane (DCM).

The dope preferably contains, per 100 parts by mass of the polymer (A), 100 to 10,000 parts by mass, more preferably 1,000 to 5,000 parts by mass of the solvent (B). The content of the active substance per 100 parts by mass of the polymer (A) is preferably 100 to 10,000 parts by mass, more preferably 100 to 1,900 parts by mass. The content of the polymer (C) per 100 parts by mass of the active substance is 10 to 1,000 parts by mass, more preferably 10 to 500 parts by mass.

The temperature of the dope is preferably 5 to 80° C., more preferably 20 to 50° C. The dope may be prepared by adding the polymer (A) to the solvent (B), fully stirring the mixture to dissolve the polymer (A) and then adding the active substance coated with the polymer (C) or by simultaneously adding and mixing the polymer (A) and the active substance coated with the polymer (C) to/with the solvent (B).

(Coagulating Liquid)

The coagulating liquid contains the solvent (D) that is a poor solvent to the polymer (A). The poor solvent refers to a Solvent having a little dissolving power to the polymer (A) as is generally said. When the polymer (A) is poly-m-phenyleneterephthalamide, the solvent (D) is preferably water. When the polymer (A) is polylactic acid, the solvent (D) is preferably a mineral oil. The coagulating liquid preferably contains 50 to 100% by mass, more preferably 85 to 100% by mass, of the solvent (D). The other component is N-methyl-2-pyrrolidne or dimethyl sulfoxide.

The coagulating liquid may contain a surfactant. The surfactant includes an anionic surfactant, a cationic surfactant, an amphoteric surfactant and a nonionic surfactant. The anionic surfactant includes a higher fatty acid, an alkyl sulfonate, an alkenyl sulfonate, an alkylbenzene sulfonate and α-olefin sulfonate. The cationic surfactant includes a linear monoalkyl quaternary ammonium salt having 12 to 16 carbon atoms and a quaternary ammonium salt having a branched alkyl having 20 to 28 carbon atoms. The amphoteric surfactant includes an alkylamine oxide whose alkyl group and acyl group have 8 to 18 carbon atoms, carbobetaine, amidobetaine, sulfobetaine and amidosulfobetaine. The nonionic surfactant includes an alkylene oxide, preferably, ethylene oxide (EO). The content of the surfactant per 100 parts by mass of the solvent (D) is preferably 0.05 to 30 parts by mass, more preferably 5 to 10 parts by mass. The temperature of the coagulating liquid is preferably 10 to 80° C., more preferably 20 to 50° C.

According to this invention, a network structure of continuous pores having a pore diameter of approximately 1 nm to 1 μm is formed in the polymer (A) on the basis of what is called spinodal decomposition.

The formed article of this invention can be produced without any special apparatus. The formed article in the form of a mass can be produced by adding the dope in the coagulating liquid. For example, the dope can be dropwise added to the coagulating liquid with a sprayer, a syringe or the like. Further, the formed article in the form of a fiber can be produced by discharging the dope into the coagulating liquid through a nozzle and taking up the resulting product. Further, the formed article in the form of a fiber, a string or a pipe can be obtained as well by discharging the dope from the air with a microsyringe or the like to pour the discharged dope into the coagulating liquid while the microsyringe or the like is moved horizontally. Further, the formed article in the form of a film can be produced by applying the dope onto a carrier material and immersing the dope-applied carrier material in the coagulating liquid. In these cases, the diameter or thickness of the formed article can be adjusted as required by changing the diameter of the spray nozzle, the application thickness or the like.

When the dope is coagulated in the coagulating liquid, cells are formed in the formed article obtained, and in each cell, the active substance coated with the polymer (C) is included.

When the formed article is washed with a solvent (E) that is a good solvent to the polymer (C), to remove the polymer (C), there can be obtained a formed article having cells, in which the active substance is included in each cell and the internal wall of each cell and the active substance are substantially not in contact with each other. As a solvent (E), water is employed.

As described above, preferably, the polymer (A) is poly-m-phenyleneterephthalamide, the solvent (B) is N-methyl-2-pyrrolidone, the polymer (C) is a water-soluble polymer and the solvent (D) is water. In other embodiment, preferably, the polymer (A) is an acryl polymer, the solvent (B) is dimethyl sulfoxide, the polymer (C) is a water-soluble polymer and the solvent (D) is water. Examples of the combination of the polymers and solvents preferably include combinations shown in the following Table 1.

TABLE 1

|  |  | Combination 1 | Combination 2 | Combination 3 |
|---|---|---|---|---|
| Dope | Polymer (A) | Aramid | Acryl | Polylactic acid |
|  | Solvent (B) | NMP | DMSO | Methylene chloride |
|  | Polymer (C) | Starch paste | Starch paste | Starch paste |
| CL | Solvent (D) | Water | Water | Methanol |
| WL | Solvent (E) | Water | Water | Methanol |

CL = Coagulating liquid, WL = Wash liquid

The formed article of this invention can be also produced by a process (second embodiment) for the production of a formed article having a plurality of cells formed in a polymer, each cell including an active substance, the process comprising coagulating a dope in a coagulating liquid, (1) the dope containing a polymer (A), a solvent (B) that is a good solvent to the polymer (A) and an active substance, (2) the coagulating liquid containing a solvent (D) that is a poor solvent to the polymer (A), and (3) the active substance being hydrophilic when the polymer (A) in the dope is a hydrophobic polymer or the active substance being hydrophobic when the polymer (A) in the dope is a hydrophilic polymer.

The polymer (A), the solvent (B) and the solvent (D) are the same as those in the first embodiment. The second embodiment does not use the polymer (C). Further, the second embodiment is characterized in that the active substance is hydrophilic when the polymer (A) is hydrophobic and that the active substance is hydrophobic when the polymer (A) is hydrophilic. The polymer (A) and the active substance have the one-against-the-other repelling natures due to a combination of hydrophilic and hydrophobic natures, so that a "bell" structure is constituted.

When the polymer (A) is a hydrophobic polymer, the active substance is hydrophilic. As a hydrophobic polymer, poly-m-phenyleneterephthalamide is employed. As a hydrophilic active substance, silica gel is employed when the polymer (A) is hydrophilic, the active substance is hydrophobic. As a hydrophilic polymer, polyvinyl alcohol is employed. As a hydrophobic active substance, activated carbon is employed.

The dope preferably contains, per 100 parts by mass of the polymer (A), 100 to 10,000 parts by mass, more preferably 1,000 to 5,000 parts by mass of the solvent (B). The content of the active substance per 100 parts by mass of the polymer is preferably 100 to 10,000 Parts by mass, more preferably 100 to 1,900 parts by mass.

The coagulating liquid is the same as those described with regard to the first embodiment.

Preferably, the polymer (A) is poly-m-phenyleneterephthalamide, the solvent (B) is N-methyl-2-pyrrolidone and the solvent (D) is water. Further, preferably, the polymer (A) is an acryl polymer, the solvent (B) is dimethyl sulfoxide and the solvent (D) is water. The active substance is at least one member selected from the group consisting of metal oxides, metals, inorganic substances, minerals, synthetic resins and organisms. Examples of the combination of the polymers and solvents preferably include combinations shown in the following Table 2.

TABLE 2

|  |  | Combination 1 | Combination 2 | Combination 3 |
|---|---|---|---|---|
| Dope | Polymer (A) | Aramid | Acryl | Polylactic acid |
|  | Solvent (B) | NMP | DMSO | Methylene chloride |
|  | Active substance | Hydrotalcite | Hydrotalcite | Hydrotalcite |
| CL | solvent (D) | Water | Water | Methanol |

CL = Coagulating liquid

EXAMPLES

This invention will be explained further in detail below with reference to Examples, while this invention shall not be limited by these Examples.

Example 1

(Preparation of Dope)

At room temperature, 100 parts by weight of poly-m-phenyleneterephthalamide (PMPTA) was dissolved in 1,900 parts by weight of N-methyl-2-pyrrolidone (NMP) to prepare a polymer solution. To 100 parts by mass of hydrotalcite (supplied by Tomita Pharmaceutical Co., Ltd.) was added 200 parts by mass of starch paste, and the entire mixture was fully stirred with a stirring rod to render it paste-like. This paste-like kneaded product was added to the polymer solution such that the content of the hydrotalcite came to be 300 parts by mass per 100 parts by mass of PMPTA, and the mixture was fully stirred with a stirring rod until the entire mixture was uniformly opacified, to prepare a dope.

(Preparation of Coagulating Liquid)

At room temperature, 1 part by mass of an anionic surfactant (Emal 0 (Production Name), supplied by Kao corporation) was added to 100 parts by weight of water, and the mixture was stirred until the surfactant was fully dissolved, to prepare a coagulating liquid.

(Forming)

At room temperature, the dope was charged into a microsyringe with a 1 ml needle and dropwise added into the coagulating liquid to obtain spheres of a formed article.

(Dissolving of Starch Paste)

Figure 2:
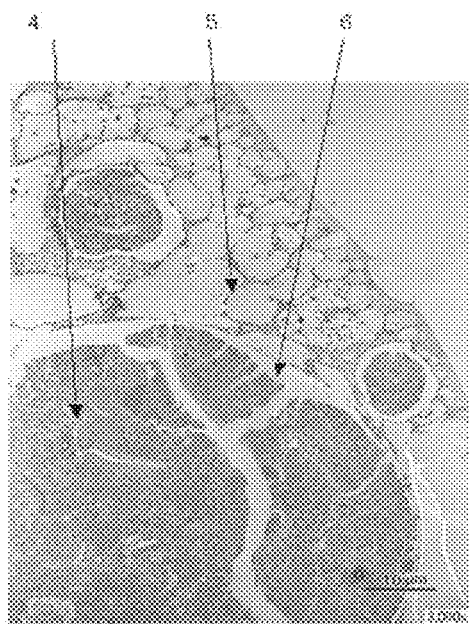
FIG. 2 is an enlarged photograph of a clearance portion in FIG. 1. A 1 to 5 µm clearance is observed between hydrotalcite and a polymer.
Figure 3:
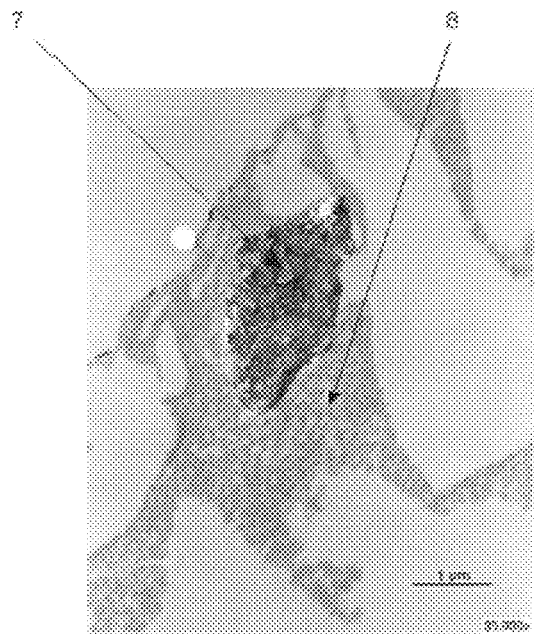
FIG. 3 is a transmission electron microscope photograph of a 50 nm thick slice of a spherical formed article obtained when the article was formed without adding any starch paste in Example 1. It is seen that a polymer adheres to a hydrotalcite surface without any clearance between hydrotalcite and the polymer.
Figure 4:
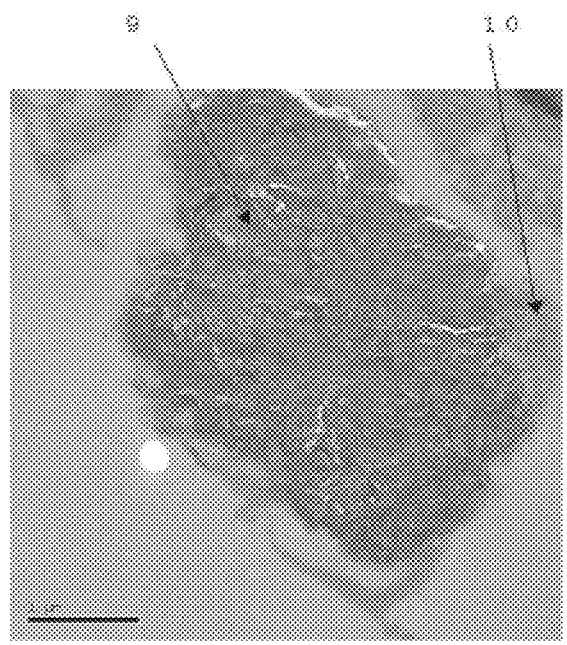
FIG. 4 is an enlarged photograph of a hydrotalcite and its periphery in FIG. 3. It is seen that a polymer adheres to a hydrotalcite surface.

The thus-obtained spheres of the formed article were warmed in a hot water bath at 80° C. for 1 hour to dissolve the starch paste, whereby the formed article having a structure shown in FIGS. 1 and 2 were obtained. FIGS. 3 and 4 show electron microscope photographs of a structure obtained without adding the starch paste.

Example 2

(Preparation of Dope)

At room temperature, 100 parts by mass of PMPTA was dissolved in 1,900 parts by mass of NMP to prepare a polymer solution. To 100 parts by mass of dry yeast ("Fukkurapan Dry Yeast (Production Name)", a handy separate bag, supplied by Nippon Flour Mills Co., Ltd.) was added 300 parts by mass of starch paste, and the entire mixture was fully stirred with a stirring rod to render it paste-like. This paste-like mixture was added to the polymer solution such that the content of the dry yeast per 100 parts by mass of PMPTA was 200 parts by mass. Further, the resultant mixture was fully stirred with a stirring rod until the entire mixture was uniformly opacified, to prepare a dope.

(Preparation of Coagulating Liquid)

At room temperature, 1 part by mass of an anionic surfactant (Emal 0 (Trade Name), supplied by Kao Corporation) was added to 100 parts by weight of water, and the mixture was stirred until the surfactant was fully dissolved, to prepare a coagulating liquid.

(Forming)

At room temperature, the dope was charged into a microsyringe having no 1 ml needle and dropwise added into the coagulating liquid to obtain spheres of a formed article. For observing the internal structure of the spheres of the formed article before the proliferation of the yeast plant, the yeast plant in some spheres of the article was immobilized in the following manner and then starch paste was dissolved in the following manner.

(Preparation of Immobilizing Liquid)

To 100 parts by mass of water was added 1 part by mass of potassium permanganate to prepare an immobilizing liquid.

(Immobilizing of Yeast Plant)

Some of the spheres of the formed article obtained by the forming were immersed in the immobilizing liquid were kept in the state at 4° C. for 2 hours.

(Dissolving of Starch Paste)

Figure 5:
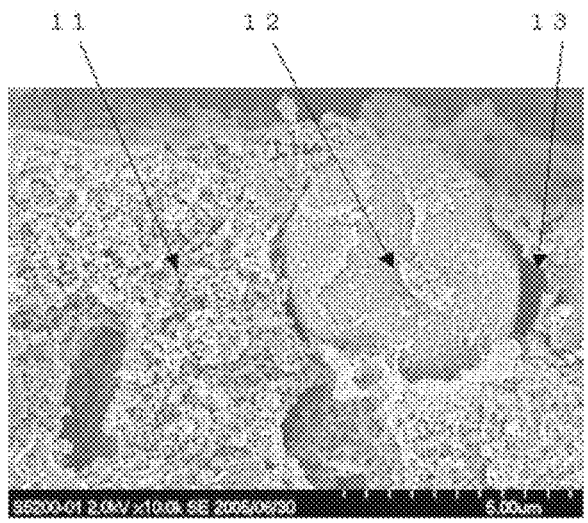
FIG. 5 is a scanning electron microscope photograph of a yeast plant in a spherical formed article produced in Example 2. It is seen that a 1 to 3 µm clearance is formed between a spherical yeast plant and a polymer having a fine-porous structure.
Figure 6:
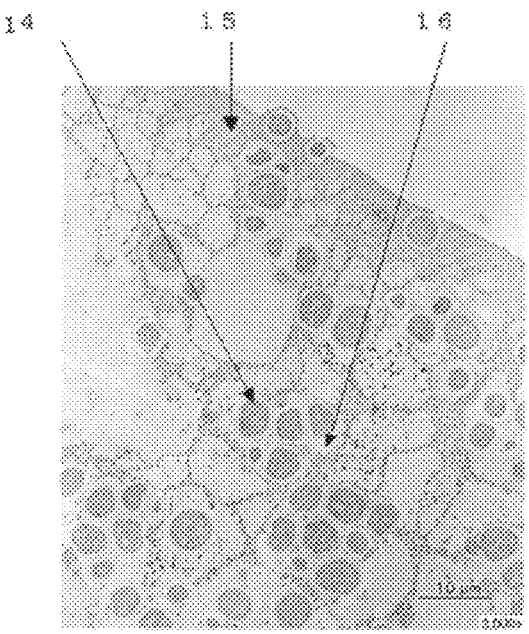
FIG. 6 is a transmission electron microscope of a 50 nm thick slice of a spherical formed article in Example 2. A clearance is observed between yeast and a polymer.
Figure 7:
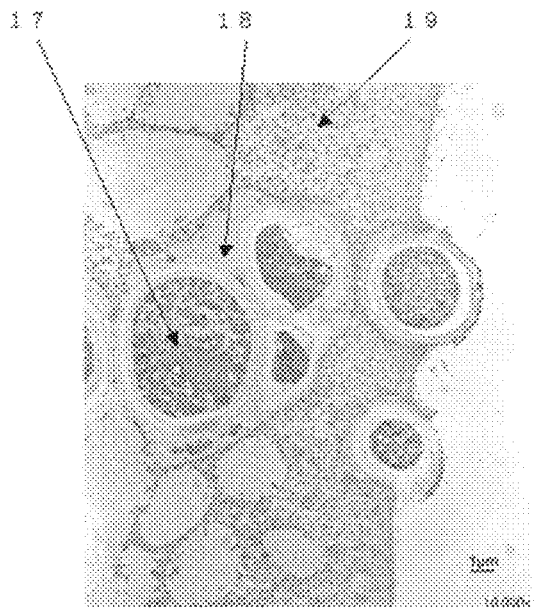
FIG. 7 is an enlarged photograph of the yeast in FIG. 6. A clearance is observed between the yeast and a polymer.

The spherical formed articles were taken out of the immobilizing liquid, placed in water and warmed in a hot water bath at 60° C. for 1 hour to dissolve the starch paste. Further, the spheres of the formed article were immersed in the immobilizing liquid and maintained at 4° C. for 2 days to give the formed article having a structure shown in FIGS. 5 to 7.

Example 3

(Preparation of Dope)

At room temperature, 100 parts by mass of PMPTA was dissolved in 1,900 parts by mass of NMP to prepare a polymer solution. To 100 parts by mass of a material Obtained by milling activated carbon ("Shirowashi GC-007" (Product Name), supplied by Japan EnvironChemicals, Ltd.) to an average particle diameter of 4 μm with a dry mill was added 300 parts by mass of starch paste, and the entire mixture was fully stirred with a stirring rod to render it paste-like. This paste-like mixture was added to the polymer solution such that the content of the activated carbon per 100 parts by mass of PMPTA was 60 parts by mass. Further, the resultant mixture was fully stirred with a stirring rod until the entire mixture was uniformly opacified, whereby a dope was obtained.

(Preparation of Coagulating Liquid)

At room temperature, 1 part by mass of an anionic surfactant (Emal 0 (Product name), supplied by Kao Corporation) was added to 100 parts by mass of water, and the mixture was stirred until the surfactant was fully dissolved, to prepare a coagulating liquid.

(Forming)

At room temperature, the dope was charged into a microsyringe having no 1 ml needle and dropwise added into the coagulating liquid to obtain spheres of a formed article.

(Dissolving Starch Paste)

Figure 8:
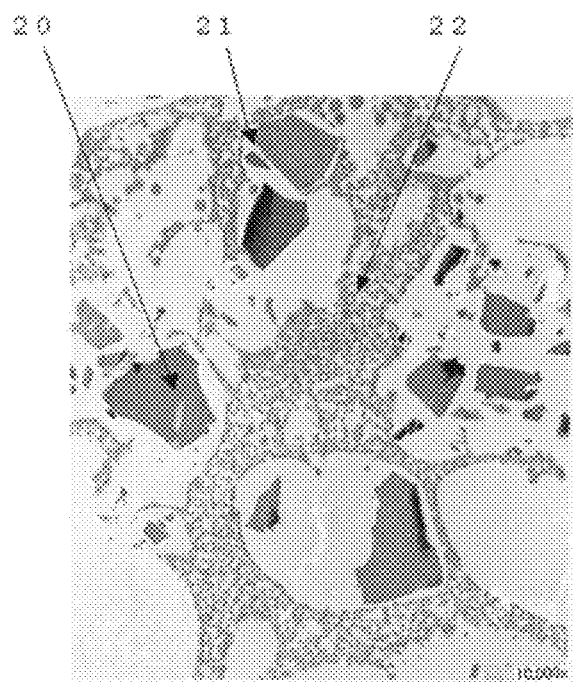
FIG. 8 is a transmission electron microscope of a 50 nm thick slice of a spherical formed article in Example 3. A clearance is observed between activated carbon and a polymer.
Figure 9:
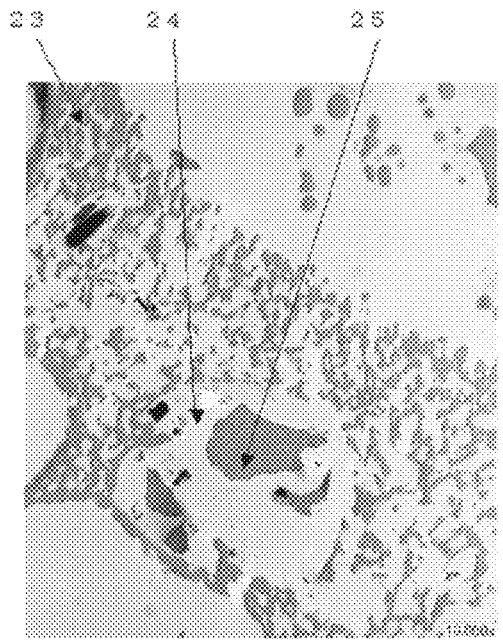
FIG. 9 is a transmission electron microscope of a 50 nm thick slice of a spherical formed article in Example 3. A clearance is observed between activated carbon and a polymer.
Figure 10:
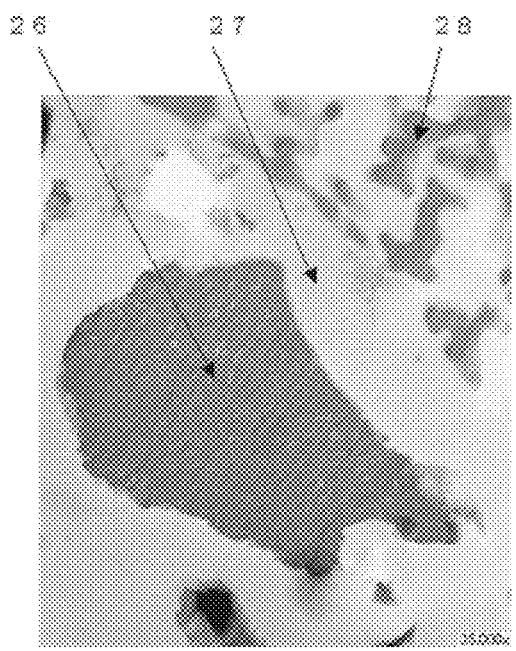
FIG. 10 is an enlarged photograph of an activated carbon portion in FIG. 9. There is no adhesion, and a clearance is observed, between activated carbon and a polymer.
Figure 11:
FIG. 11 is a transmission electron microscope photograph of a 50 nm thick slice of a spherical formed article obtained when the article was formed without adding any starch paste in Example 3. It is seen that a polymer adheres to an activated carbon surface without any clearance between activated carbon and a polymer.
Figure 12:
FIG. 12 is a transmission electron microscope photograph of a 50 nm thick slice of a spherical formed article obtained when the articles was formed without adding any starch in Example 3. It is seen that a polymer adheres to an activated carbon surface without any clearance between activated carbon and a polymer.
Figure 13:
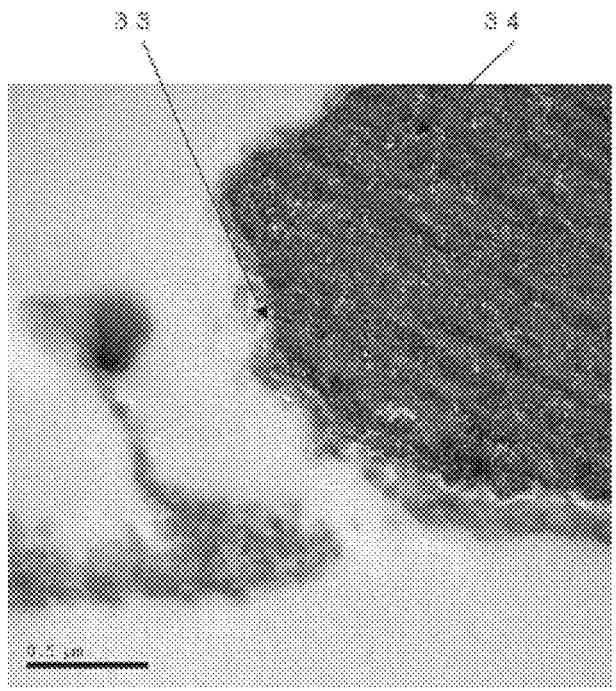
FIG. 13 is an enlarged photograph of an activated carbon portion in FIG. 12. It is seen that a polymer adheres to an activated carbon surface.

The thus-obtained spheres of the formed article were placed in water and warmed in a hot water bath at 60° C. for 1 hour to dissolve the starch paste, whereby a formed article having a structure shown in FIGS. 8 to 10 were obtained. FIGS. 11 to 13 show electron microscope photographs of a structure produced without adding any starch paste.

Example 4

(Preparation of Dope)

At room temperature, 100 parts by mass of PMPTA was dissolved in 1,900 parts by mass of NMP to prepare a polymer solution. To 100 parts by mass of a material obtained by milling activated carbon ("Shirowashi GC-007" (Product Name), supplied by Japan EnvironChemicals, Ltd.) to an average particle diameter of 4 μm with a dry Mill was added 300 parts by mass of starch paste, and the entire mixture was fully stirred with a stirring rod to render it paste-like. This paste-like mixture was added to the polymer solution such that the content of the activated carbon per 100 parts by mass of PMPTA was 60 parts by mass. Further, the resultant mixture was fully stirred with a stirring rod until the entire mixture was uniformly opacified, whereby a dope was obtained.

(Preparation of Coagulating Liquid)

At room temperature, 1 part by mass of an anionic surfactant (Emal 0 (Product Name), supplied by Kao Corporation) was added to 100 parts by mass of water, and the mixture was stirred until the surfactant was fully dissolved, to prepare a coagulating liquid.

(Forming)

Figure 14:
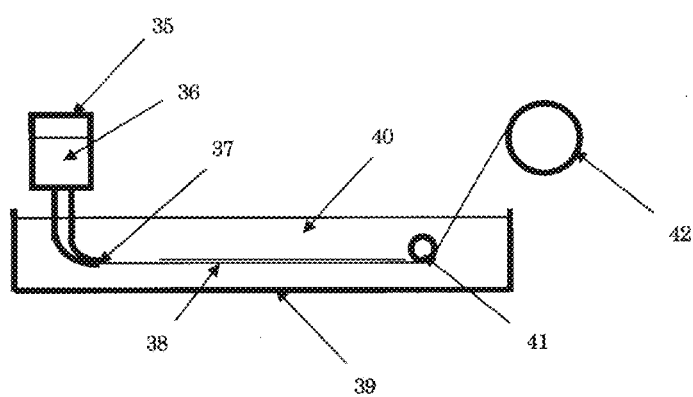
FIG. 14 is a schematic drawing of an apparatus used for producing a fibrous formed article in Example 4.

At room temperature, the dope was discharged into the coagulating liquid with an apparatus shown in FIG. 14, and the resulting product was taken up with a roller to give a fibrous formed article.

(Dissolving of Starch Paste)

Figure 15:
FIG. 15 is a scanning electron microscope photograph of a cross section of the fibrous formed article in Example 4.

The fibrous formed article was cut to a length of 2 to 3 mm, and the cut pieces were placed in water and warmed in a hot bath at 60° C. for 1 hour to dissolve the starch paste. FIG. 15 shows a scanning electron microscope photograph of the thus-obtained fibrous formed article.

Example 5

The fibrous shaped article obtained in example 4 was packed in a transparent column having an internal diameter of 30 mm and a length of 100 mm. The fiber packing amount was 13 g, and this weight included 8.6 g of the activated carbon.

(Filtering)

Water (raw water) was sampled from the Imaidogawa River in Osaka Prefecture and allowed to stand for 1 day. A supernatant thereof was sampled and subjected to pre-chlorine treatment with a sodium hypochlorite aqueous solution such that it had a free residual chlorine content of 1.0 mg/L. The thus-treated supernatant was caused to flow through the column upwardly at a superficial velocity of 20 $h^{-1}$ and at a linear velocity of 2 m/h with a pump. Water on the column outlet side was subjected to post-chlorine treatment with a sodium hypochlorite aqueous solution so as to have a free residual chlorine content of 1.0 mg/L.

(Analysis Results)

On the basis of a difference between TOC concentrations on the inlet and outlet sides of the column, a liquid that passed through the column before the functional destruction of the column was measured for an amount to show 310 liters. The removal amount of organic substances captured by adsorption in a dissolved state was 21.1 mg-C/g, and the removal amount of them captured among the fibers in a suspension state was 50.3 mg-C/g.

Table 3 shows the results of comparisons of concentrations of geosmin and 2-methylisoborneol in the raw water and the treated water. A water purification effect of the formed article of this invention was confirmed.

TABLE 3

|  | Raw water | Treated water |
|---|---|---|
| Geosmin (μg/L) | 0.052 | ND |
| 2-Methylisoborneol (μg/L) | 0.009 | 0.001 |

ND: Detection limit or less

Comparative Example 1

(Column Packing)

A transparent column having an internal diameter of 30 mm and a length 100 mm was packed with 8.6 g of particulate activated carbon (granular activated carbon, supplied by Wako-Purechemical Ind. Co., Ltd.) having a mass equivalent to that in Example 5.

(Filtering)

Water was sampled from the Imaidogawa River in Osaka Prefecture and allowed to stand for 1 day. A supernatant thereof was sampled and subjected to pre-chlorine treatment with a sodium hypochlorite aqueous solution such that it had a free residual chlorine content of 1.0 mg/L. The thus-treated supernatant was caused to flow through the column upwardly at a superficial velocity of 20 $h^{-1}$ at a linear velocity of 2 m/h with a pump. Water on the column outlet side was subjected to post-chlorine treatment with a sodium hypochlorite aqueous solution so as to have a free residual chlorine content of 1.0 mg/L.

(Analysis Results)

On the basis of a difference between TOC concentrations on the inlet and outlet sides of the column, a liquid that passed through the column before the functional destruction of the column was measured for an amount to show 10 liters, which was much smaller than the result in Example 5. Further, the removal amount of organic substances captured by adsorption in a dissolved state was 0.7 mg-C/g, and the removal amount of them captured among the fibers in a suspension state was 0.2 mg-C/g, both of which were much smaller than the results in Example 5.

Effect of the Invention

The formed article of this invention ensures that an active substance included therein and a substance outside capsules can effectively come in contact with each other without suffering influences such as a pressure loss. The formed article of this invention ensures that the surface area thereof can be utilized to the utmost without having the surface of an active substance coated with a polymer. The formed article of this invention ensures that an active substance does not easily come off or separate even when external friction or the like is exerted. The formed article of this invention ensures that an active substance does not directly come in contact with a human body or is not sucked into a human body.

INDUSTRIAL UTILITY

The formed article of this invention, which includes an active substance therein, is expected to be applied to various fields such as environmental cleanups including atmosphere and water treatment and the production of chemical products. For example, when an adsorbent to adsorb VOC or the like is supported inside, adsorption treatment can be efficiently carried out.

What is claimed is:

1. A process for the production of a formed article having a plurality of cells formed in a polymer (A), wherein each cell including an active substance, the process comprises coagulating a dope in a coagulating liquid, characterized in that
   (1) the dope contains the polymer (A), a solvent (B) and an active substance coated with a polymer (C),
   (2) the coagulating liquid contains a solvent (D) that is a poor solvent to the polymer (A),
   (3) the polymer (C) is incompatible with the polymer (A), and
   (4) the solvent (B) is a good solvent to the polymer (A) and is a poor solvent to the polymer (C).

2. The process of claim 1, wherein the polymer (A) is a hydrophobic polymer.

3. The process of claim 1, wherein the dope contains, per 100 parts by mass of the polymer (A), 100 to 10,000 parts by mass of the solvent (B).

4. The process of claim 1, wherein the polymer (A) is poly-m-phenyleneterephthalamide, the solvent (B) is N-methyl-2-pyrrolidone, the polymer (C) is a water-soluble polymer and the solvent (D) is water.

5. The process of claim 1, wherein the polymer (A) is an acryl polymer, the solvent (B) is dimethyl sulfoxide, the polymer (C) is a water-soluble polymer and the solvent (D) is water.

6. The process of claim 1, wherein the active substance is at least one member selected from the group consisting of metal oxides, metals, inorganic substances, minerals, synthetic resins and organisms.

7. The process of claim 1, wherein the coagulation is followed by washing the formed article with a solvent (E) that is a good solvent to the polymer (C), to remove the polymer (C).

8. The process of claim 7, wherein the solvent (E) is water.

9. A process for the production of a formed article having a plurality of cells formed in a polymer, wherein each cell includes an active substance, the process comprises coagulating a dope in a coagulating liquid, characterized in that
   (1) the dope contains a polymer (A), a solvent (B) that is a good solvent to the polymer (A) and an active substance coated with a polymer (C),
   (2) the coagulating liquid containing a solvent (D) that is a poor solvent to polymer (A), and
   (3) the active substance is hydrophilic when the polymer (A) in the dope is a hydrophobic polymer or the active substance is hydrophobic when the polymer (A) in the dope is a hydrophilic polymer.

10. The process of claim 9, wherein the polymer (A) is a hydrophobic polymer and the active substance is hydrophilic.

11. The process of claim 9, wherein the dope contains, per 100 parts by mass of the polymer (A), 100 to 10,000 parts by mass of the solvent (B).

12. The process of claim 9, wherein the polymer (A) is poly-m-phenyleneterephthalamide, the solvent (B) is N-methyl-2-pyrrolidone and the solvent (D) is water.

13. The process of claim 9, wherein the polymer (A) is an acryl polymer, the solvent (B) is dimethyl sulfoxide and the solvent (D) is water.

14. The process of claim 9, wherein the active substance is at least one member selected from the group consisting of metal oxides, metals, inorganic substances, minerals, synthetic resins and organisms.

* * * * *